United States Patent

Griffith et al.

[11] Patent Number: 5,888,389
[45] Date of Patent: Mar. 30, 1999

[54] APPARATUS FOR OXIDIZING UNDIGESTED WASTEWATER SLUDGES

[75] Inventors: James Walton Griffith; William Tracy Wofford, III, both of Austin; James Randolph Griffith, Port Lavaca, all of Tex.

[73] Assignee: HydroProcessing, L.L.C., Austin, Tex.

[21] Appl. No.: 847,523

[22] Filed: Apr. 24, 1997

[51] Int. Cl.⁶ .................................................. C02F 1/02
[52] U.S. Cl. ........................ 210/175; 210/123; 210/130; 210/134; 210/181; 210/188; 210/206
[58] Field of Search ............................. 210/86, 121, 123, 210/130, 134, 181, 188, 198.1, 206, 175

[56] References Cited

U.S. PATENT DOCUMENTS

| | | | |
|---|---|---|---|
| 2,665,249 | 1/1954 | Zimmermann | 210/2 |
| 3,207,572 | 9/1965 | Saul | 23/49 |
| 3,876,497 | 4/1975 | Hoffman | 162/189 |
| 3,876,536 | 4/1975 | Pradt et al. | 210/10 |
| 3,920,506 | 11/1975 | Morgan | 162/31 |
| 3,977,966 | 8/1976 | Pradt et al. | 210/17 |
| 4,000,068 | 12/1976 | Nelson et al. | 210/50 |
| 4,013,560 | 3/1977 | Pradt | 210/152 |
| 4,100,730 | 7/1978 | Pradt | 60/39.05 |
| 4,113,446 | 9/1978 | Modell et al. | 48/202 |
| 4,141,829 | 2/1979 | Thiel et al. | 210/63 |
| 4,174,280 | 11/1979 | Pradt et al. | 210/60 |
| 4,241,722 | 12/1980 | Dickinson | 126/263 |
| 4,284,015 | 8/1981 | Dickinson | 110/347 |
| 4,292,953 | 10/1981 | Dickinson | 126/263 |
| 4,338,199 | 7/1982 | Modell | 210/721 |
| 4,465,888 | 8/1984 | Paspek, Jr. | 585/520 |
| 4,483,761 | 11/1984 | Paspek, Jr. | 208/106 |
| 4,543,190 | 9/1985 | Modell | 210/721 |
| 4,564,458 | 1/1986 | Burleson | 210/747 |
| 4,594,164 | 6/1986 | Titmas | 210/741 |
| 4,692,252 | 9/1987 | Atwood et al. | 210/761 |
| 4,713,177 | 12/1987 | Atwood et al. | 210/697 |
| 4,751,005 | 6/1988 | Mitsui | 210/759 |
| 4,792,408 | 12/1988 | Titmas | 210/747 |
| 4,822,497 | 4/1989 | Hong et al. | 210/721 |
| 4,861,497 | 8/1989 | Welch | 210/759 |
| 4,869,833 | 9/1989 | Binning et al. | 210/761 |
| 4,891,139 | 1/1990 | Zeigler | 210/747 |
| 4,983,296 | 1/1991 | McMahon et al. | 210/603 |
| 5,035,346 | 7/1991 | Kálmán | 222/68 |
| 5,100,560 | 3/1992 | Huang | 210/721 |

(List continued on next page.)

OTHER PUBLICATIONS

Subcritical and Supercritical Water Oxidization of Industrial, Excess Activated Sludge, Ernest F. Gloyna, Abdullah Shanableh, Tech Report, CRWR211.

SCWO of Amaerobically Digested Municipal Sludge, Chanin Tonghamachart, Ernest Gloyna, Tech Report CRWR231.

*Primary Examiner*—Jay H. Woo
*Assistant Examiner*—Betsey J. Morrison
*Attorney, Agent, or Firm*—Shaffer & Culbertson, LLP; Russell D. Culbertson

[57] ABSTRACT

A hydrothermal process (10) is integrated into a wastewater treatment facility (12) to fully oxidize an undigested wastewater sludge produced by the treatment facility. A thickened and conditioned feed mixture comprising sludge from the treatment facility is first pressurized to a critical pressure and then heated to a reaction initiating temperature below the critical temperature. An oxidant is injected into the feed mixture at the reaction initiating temperature to initiate an oxidation reaction in low light-off temperature constituents of the feed mixture to produce a partially reacted mixture and raise the temperature of the partially reacted mixture to at least the critical temperature for water in a supercritical water oxidation reactor (52). Heat from the supercritical water oxidation reaction is used to heat the feed mixture and also, to condition the sludge from the wastewater treatment plant preferably by thickening and heating the sludge. The effluent from the supercritical water oxidation reactor (52) may also be used to produce a standard, high quality steam which may be used to drive a steam turbine (72). Solids laden effluent from the supercritical water oxidation reactor (52) is reduced in a pressure reducing arrangement (90).

11 Claims, 3 Drawing Sheets

U.S. PATENT DOCUMENTS

| | | | |
|---|---|---|---|
| 5,106,513 | 4/1992 | Hong | 210/759 |
| 5,133,877 | 7/1992 | Rofer et al. | 210/761 |
| 5,200,093 | 4/1993 | Barner et al. | 210/761 |
| 5,217,625 | 6/1993 | Khan et al. | 210/761 |
| 5,221,486 | 6/1993 | Fassbender | 210/757 |
| 5,232,604 | 8/1993 | Swallow et al. | 210/759 |
| 5,240,619 | 8/1993 | Copa et al. | 210/752 |
| 5,252,224 | 10/1993 | Modell et al. | 210/695 |
| 5,280,701 | 1/1994 | Tolman | 60/39.02 |
| 5,326,540 | 7/1994 | Chastagner | 422/205 |
| 5,358,645 | 10/1994 | Hong | 210/761 |
| 5,358,646 | 10/1994 | Gloyna et al. | 210/762 |
| 5,360,553 | 11/1994 | Baskis | 210/774 |
| 5,372,725 | 12/1994 | Halff et al. | 210/761 |
| 5,385,214 | 1/1995 | Spurgeon | 180/304 |
| 5,386,055 | 1/1995 | Lee et al. | 562/512.2 |
| 5,387,398 | 2/1995 | Mueggenburg et al. | 422/168 |
| 5,405,533 | 4/1995 | Hazlebeck et al. | 210/634 |
| 5,409,617 | 4/1995 | Ross et al. | 210/762 |
| 5,417,953 | 5/1995 | Cappelli | 423/446 |
| 5,421,998 | 6/1995 | Li et al. | 210/136 |
| 5,433,868 | 7/1995 | Fassbender | 210/761 |
| 5,433,878 | 7/1995 | Arai et al. | 252/62.63 |
| 5,437,798 | 8/1995 | LaRoche et al. | 210/761 |
| 5,454,950 | 10/1995 | Li et al. | 210/636 |
| 5,461,648 | 10/1995 | Nauflett et al. | 376/305 |
| 5,470,377 | 11/1995 | Whitlock | 95/90 |
| 5,470,481 | 11/1995 | Modell et al. | 210/652 |
| 5,480,630 | 1/1996 | Arai et al. | 423/625 |
| 5,492,634 | 2/1996 | Hong et al. | 210/761 |
| 5,501,799 | 3/1996 | Bond et al. | 210/721 |
| 5,524,665 | 6/1996 | Kolpak | 137/173 |
| 5,527,466 | 6/1996 | Li et al. | 210/636 |
| 5,527,471 | 6/1996 | Hong et al. | 210/761 |
| 5,538,540 | 7/1996 | Whitlock | 96/111 |
| 5,543,057 | 8/1996 | Whiting et al. | 210/721 |
| 5,545,337 | 8/1996 | Hong | 210/761 |
| 5,551,472 | 9/1996 | McBrayer, Jr. et al. | 137/114 |
| 5,552,039 | 9/1996 | McBrayer, Jr. | 210/90 |
| 5,558,783 | 9/1996 | McGuinness | 210/761 |
| 5,560,822 | 10/1996 | Bond et al. | 210/181 |
| 5,560,823 | 10/1996 | Whiting | 210/205 |
| 5,571,423 | 11/1996 | Daman | 210/761 |
| 5,571,424 | 11/1996 | Ahluwalia | 210/76.1 |
| 5,620,606 | 4/1997 | McBrayer et al. | 210/696 |
| 5,651,897 | 7/1997 | Lehmann | 210/761 |

APPARATUS FOR OXIDIZING UNDIGESTED WASTEWATER SLUDGES

BACKGROUND OF THE INVENTION

This invention relates to wastewater treatment and more particularly, to the treatment of undigested wastewater sludges. The invention includes both an apparatus and method for economically oxidizing sludges to produce products which may be discharged into the environment or readily disposed of.

Municipal and other wastewater treatment plants use various processes to break down the raw sewage influent and produce a sewage sludge. The final sludge product includes water, organic material, and smaller quantities of inorganic and inert material.

A typical wastewater treatment plant first produces a primary sludge collected from a primary clarifier or sedimentation unit. A secondary sludge is collected from a holding basin after a process is applied to the material remaining after removal of the primary sludge. The water separated from the secondary sludge is commonly treated with a disinfecting agent such as chlorine and then discharged from the plant. The process used to produce the secondary sludge may be a biological process such as an activated sludge process, a trickling filter system, an aerated lagoon, or a rotating biological contactor. The process may also be a physical-chemical process. The combined primary and secondary sludges are commonly thickened, and then digested to further break down the organic material. Finally, the digested sludge is dewatered to produce a material which may be disposed of in some manner.

There are a number of problems associated with these common wastewater treatment plants. First, the facilities are expensive and difficult to operate and generally provide no useful products. The sludge from some wastewater treatment facilities may be composted to produce a material suitable for use as a soil amendment or fertilizer, however, this by-product is made only at considerable cost. Sludges which are not used to make a compost leave the problem of disposal.

A hydrothermal process known as supercritical water oxidation has been suggested for completely oxidizing digested sewage sludges and other organic wastes. Another hydrothermal process commonly referred to as wet air oxidation has been used for oxidizing various organic materials. As used herein, "wet air oxidation" refers to a hydrothermal oxidation process conducted at lower than the critical temperature for water, whereas "supercritical water oxidation" refers to a hydrothermal oxidation process which is carried out at supercritical conditions for water, that is, at or above the critical temperature and the critical pressure. The critical temperature for pure water is approximately 705° F. (374° C.) while the critical pressure is 3199 psia (220.4 bar). The goal of either process is to destroy the organic material in the sludge by oxidation. While wet air oxidation generally cannot achieve complete oxidation of a particular feed, supercritical water oxidation may oxidize substantially all organic material in the reaction mixture leaving water, $CO_2$, $N_2$, and inorganic materials such as metals, salts, sand, and clay.

The amount of organic material to be destroyed in a waste such as a sewage sludge may be described in terms of the chemical oxygen demand or COD of the material. Generally, the COD of a given material is the amount of oxygen required to completely oxidize the material. Also, both wet air oxidation and supercritical water oxidation are exothermal reactions and the feed materials for the reactions may be described in terms of their heating value, commonly expressed in Btu/pound of feed material. Sewage sludges may further be described in terms of volatile suspended solids or VSS in weight percent. VSS may be defined as the relative organic material content of the total mixture.

U.S. Pat. No. 4,338,199 to Modell (the "'199 Patent") suggests that sewage sludges may be reacted with an oxidant at temperatures and pressures at supercritical conditions to substantially remove all COD from the sludge. The '199 Patent teaches initiating the oxidation reaction only at supercritical conditions to achieve the desired destruction of organic material. The disclosed system requires a feed having a low organic material concentration or COD in order to maintain the reaction temperature at acceptable levels in the supercritical water oxidation reactor. Temperatures above approximately 1100° F. to 1200° F. may weaken reactor vessel materials to a point at which the material is unable to withstand the force from the pressure of the reaction mixture. Furthermore, reaction temperatures above 1400° F. may cause the formation of $NO_x$.

U.S. Pat. No. 5,240,619 to Copa (the "'619 Patent") discloses a two stage oxidation reaction for high strength wastewaters. In the process shown in the '619 Patent, most of the COD is removed in a wet air oxidation reaction conducted in a separate reactor. Any remaining COD is removed in a supercritical water oxidation reactor.

Neither the '199 Patent, nor the '619 Patent is directed to the treatment of undigested sewage sludges. The '199 Patent cannot accommodate the oxidation of high strength undigested sewage sludges and relies on digestion of the sludge or dilution to produce a feed mixture having a lower COD and heating value. The system disclosed in the '619 Patent requires a separate subcritical or wet air oxidation reactor to retain the material at subcritical conditions for a sufficient time to remove the bulk of the COD. Thus, the '619 Patent process requires additional equipment and relatively long residence times to accommodate the relatively slow separate subcritical oxidation process.

U.S. Pat. No. 5,433,868 to Fassbender (the "'868 Patent") is directed specifically to the treatment of dewatered sewage sludge and primarily to the problem of removing nitrogen compounds from the discharge stream of the treatment plant. The process disclosed in the '868 Patent preferably includes liquefying the sewage sludge in an alkaline digestion process to produce a low ammonia content stream and a high ammonia content stream. This high ammonia content stream is subjected to a hydrothermal process to destroy most of the ammonia in the stream. In another embodiment, the '868 Patent suggests that an undigested, dewatered sewage sludge may be treated with a hydrothermal process to remove nitrogen. However, where the hydrothermal process is applied to the complete dewatered undigested sludge, the removal efficiency for nitrogen compounds is reduced. In any event, the effluent from the hydrothermal process is not a clean product and must be returned to the treatment plant ahead of the primary clarifier.

SUMMARY OF THE INVENTION

It is an object of the invention to provide an apparatus and method for wastewater treatment which overcomes the above-described deficiencies and others associated with prior wastewater treatment systems. More particularly, it is an object of the invention to provide an apparatus and method for quick and cost effective treatment and oxidation of an undigested sewage sludge.

In order to accomplish these objects, a wastewater treatment facility according to the invention includes a hydrothermal processing component integrated with the treatment plant so as to maximize the use of energy from the hydrothermal reaction. According to the invention, heat energy from the hydrothermal reaction may be used to condition and preheat the feed material to produce a relatively high COD or VSS feed mixture. The hydrothermal process may also be integrated to economically recover mechanical energy which may be used to produce electricity or to recover useful steam. Also, the invention includes a robust arrangement for reducing the pressure of the effluent from the hydrothermal process.

The hydrothermal processing arrangement according to the invention is particularly adapted for using a feed comprising an undigested sewage sludge. The invention takes advantage of the higher heating value and make-up of an undigested sludge and eliminates the digestion and dewatering steps commonly performed in a wastewater treatment plant. The elimination of these digestion and dewatering steps saves significant costs and enhances the overall economics of the system. The invention is not limited to undigested sewage sludges, but may be useful in economically processing any feed material which includes a sufficient concentration of low light-off temperature constituents and has a total heating value within a certain range.

The preferred form of the invention takes a thickened, undigested sewage sludge from the wastewater treatment plant to form a feed mixture having a VSS of approximately 1.0% to 14.4% by weight. This equates to a feed mixture heating value of 100 Btu to 1400 Btu per pound. After conditioning the sludge to produce the feed mixture comprising organic material, inert and inorganic materials, and water, the feed mixture is pressurized to a supercritical pressure using a high pressure pump. The pressurized feed mixture is then heated in a primary heat exchanger by heat exchange with hot effluent from a supercritical water oxidation reactor.

According to the invention, the temperature of the feed mixture is increased above a light-off or reaction initiating temperature for some of the constituent organic material. An oxidant is injected into the feed mixture at a point or points in the process at which the feed mixture is at a critical pressure and a subcritical temperature, for example 250° F. to 450° F., to initiate an oxidation reaction. Initiating the oxidation reaction at this subcritical reaction initiating temperature produces heat to raise the temperature of the remainder of the feed mixture to a supercritical temperature either before the mixture enters the supercritical water oxidation reactor or while the mixture is in the reactor.

The benefit of initiating the oxidation reactions at a subcritical temperature is twofold. First, the heat of reaction provides a significant amount of the sensible heat required to raise the feed mixture to a supercritical temperature. Capturing the heating value of the sludge along with heating the feed mixture by heat exchange with the reactor effluent yields a significant energy savings. Second, by beginning the reactions at subcritical temperatures, a larger temperature rise can be accommodated before reaching the maximum operating temperature, 1400° F. for example, and thus, higher concentrations of sludges can be fed to the unit. If, however, oxidant addition was delayed until after the sludge had been heated to a supercritical temperature, then the allowable temperature rise due to the heat of reaction would be much smaller and the COD and VSS of the feed mixture would be limited to a lower value.

In another aspect of the invention, a solids separator receives the supercritical water oxidation effluent to form two effluent streams, a clean fluid effluent and a solids laden fluid effluent. The clean fluid effluent is directed to a pressure reducing arrangement to reduce the pressure and produce a standard quality steam, such as a 600 psig steam for example. Although this standard quality steam may be used for any suitable purpose, the steam is preferably expanded across a steam turbine which may be connected to drive an electrical generator. Thus, the system according to the invention may economically recover electrical energy from the energy of the supercritical water oxidation reaction and any additional energy required to achieve the desired subcritical reaction initiating temperature.

The invention also preferably includes an arrangement for using heat from the supercritical water oxidation effluent to condition the sludge from the wastewater treatment plant. The conditioning may include reducing the water content of the sludge, preheating to provide some of the initial energy required in the overall process, or preheating to reduce the viscosity and improve the overall flow characteristics of the sludge, or any combination of these steps.

In the preferred form of the invention, heat from the supercritical water oxidation reaction is further recovered from the solids laden fluid after solids separation. This solids laden fluid is preferably passed through a secondary heat exchanger to heat the feed mixture prior to the point at which the feed mixture enters the primary heat exchanger.

The invention further includes an arrangement for reducing the pressure of the solids laden portion of the supercritical water oxidation effluent. The arrangement combines the robustness and reliability of a static pressure reducing device with the flexibility and control of a pressure regulating valve. According to the invention, a static pressure reducing mechanism first reduces the pressure of the solids laden effluent to a gas phase pressure to allow both a liquid and gas phase to exist. The mixture is then allowed to segregate by gravity in a pressure vessel. An off gas releasing conduit is positioned at the top of the pressure vessel and includes a back pressure regulating valve operated to maintain the gas phase pressure in the pressure vessel. A liquid conduit draws solids laden liquid from the bottom of the vessel and includes a liquid removal valve. The liquid removal valve is opened periodically under the control of a mechanism adapted to maintain a desired liquid level in the vessel. The liquid removal valve, unlike a standard pressure regulating valve, operates in either a full-open or full-closed position. It is, therefore, not subject to the severe erosion from solid particles that would occur in a pressure regulating valve where the flow area is much smaller and fluid velocities much higher. Pressure transients within the separation vessel which may be caused by the opening or closing of the liquid removal valve are effectively dampened by the expansion or compression of the gas volume above the liquid. Changes over time in the pressure drop across the static pressuring reducing device due to erosion are compensated for automatically by the back pressure regulating valve in the off gas releasing conduit. Thus, the pressure of the solids laden effluent stream is safely and economically reduced to atmospheric or near atmospheric pressure without the problems normally associated with the pressure let down from a high pressure solids laden steam.

These and other objects, advantages, and features of the invention will be apparent from the following description of the preferred embodiments, considered along with the accompanying drawings.

DESCRIPTION OF THE PREFERRED EMBODIMENTS

Figure 1:
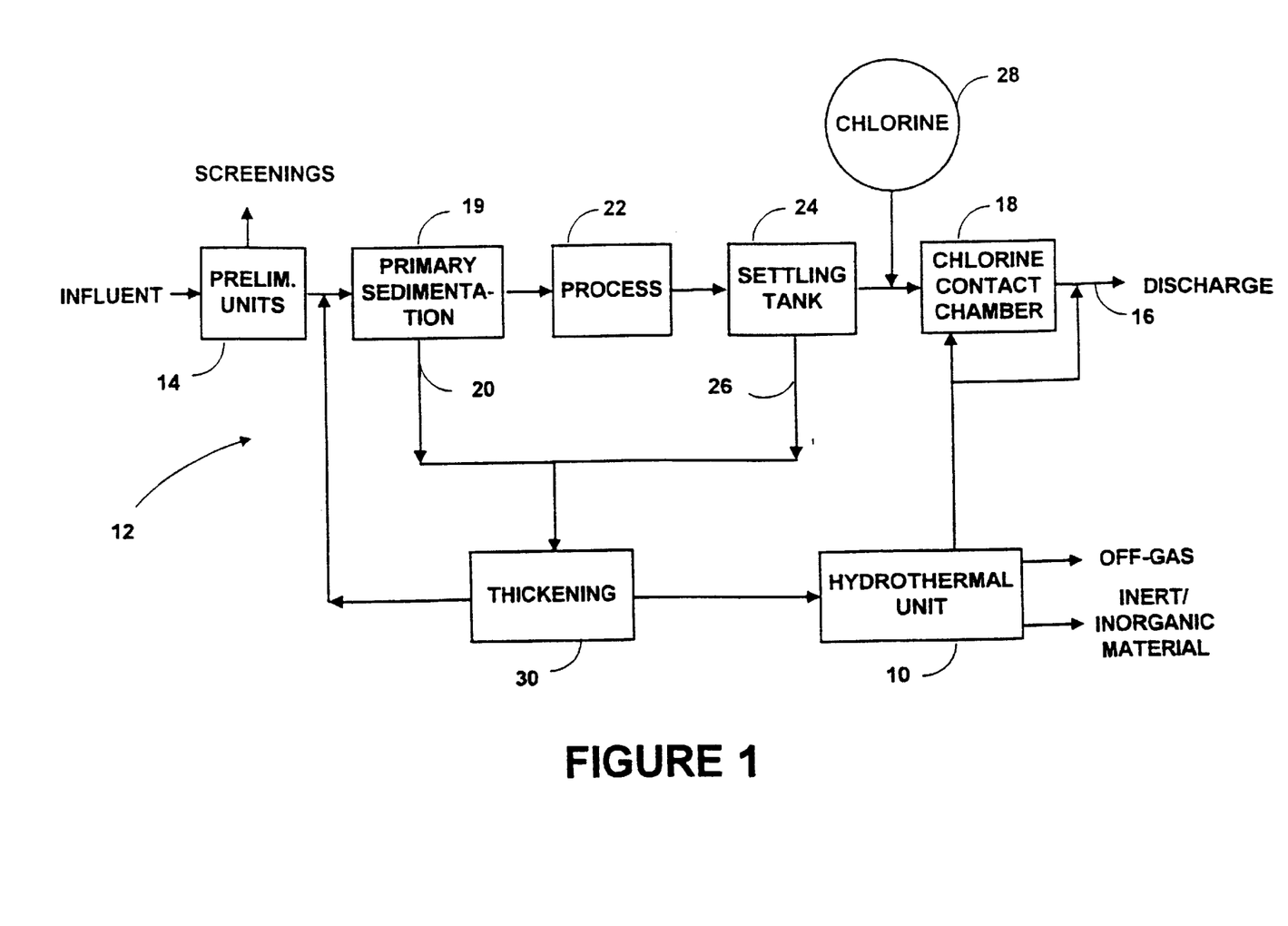
FIG. 1 is a diagrammatic representation of a wastewater treatment facility and integrated hydrothermal treatment process embodying the principles of the invention.

As shown in FIG. 1, the invention incorporates a hydrothermal processing unit 10 into a wastewater treatment plant 12. According to the invention, the hydrothermal unit 10 receives and treats all solids from the plant other than material removed from the initial screening units 14. The hydrothermal unit 10 operates to oxidize substantially all organic material in the undigested sludge from the treatment plant and produce an off gas, water, and inert or inorganic material. The off gas comprises primarily $CO_2$ with relatively small amounts of $N_2$, $O_2$, and water vapor, and may further include some very minor quantities of volatile organics, CO, and $NO_x$. The off gas may be released to the atmosphere or recovered for some use. The water from the hydrothermal unit 10 is clean enough to return at any point in the facility, preferably either to the plant discharge 16 or to the chlorine contact basin or chamber 18. The inert or inorganic solids may comprise sand, clay, salts, and metals, and may be disposed of in any desired manner consistent with any applicable regulations.

The wastewater treatment plant 12 receives raw sewage influent at the preliminary units 14 which separate out materials such as coarse solids, grit and grease. After the preliminary units 14, the raw sewage is directed to a primary sedimentation basin or a clarifier 19 which allows a primary sludge to settle out for removal through line 20. After the primary sludge is removed, the remaining material is subjected to a suitable treatment process 22. The treatment process may be a biologically based process such as an activated sludge process, a trickling filter system, an aerated lagoon process or a rotating biological contactor. The process may alternatively comprise a physical-chemical process. Regardless of the particular process employed, the processed material is again held in a settling tank 24 to allow a secondary sludge to settle out. This secondary sludge is removed from the settling tank 24 through line 26 and the water is removed from the settling tank and treated with chlorine in the chlorine contact chamber or basin 18. The chlorine or chlorine containing compound such as sodium hypochlorite is injected from injection unit 28.

The primary and secondary sludges are combined and thickened by one or more thickening units 30 to produce an undigested, thickened sewage sludge. The water removed in the thickening process is recycled through the plant 12 and commonly returned to the primary sedimentation basin 19. The thickened, undigested sludge commonly has a total suspended solids concentration in the range of 2% to 10% by weight while the unthickened sludge may have a total suspended solids content of approximately 0.5% to 7% by weight. The solids in the undigested sludge include organic solids such as cellulosic materials and other biological materials, inorganic materials such as sand, clay, metal and salts, nitrogen compounds and phosphorous compounds, for example.

Those skilled in the art will appreciate that some wastewater treatment facilities do not include a primary clarifier such as unit 19 in FIG. 1. In these facilities, only a single sludge is collected after the application of the particular treatment process such as process 22. This single sludge is to be considered equivalent to the combined primary and secondary sludges for purposes of this disclosure.

Figure 2:
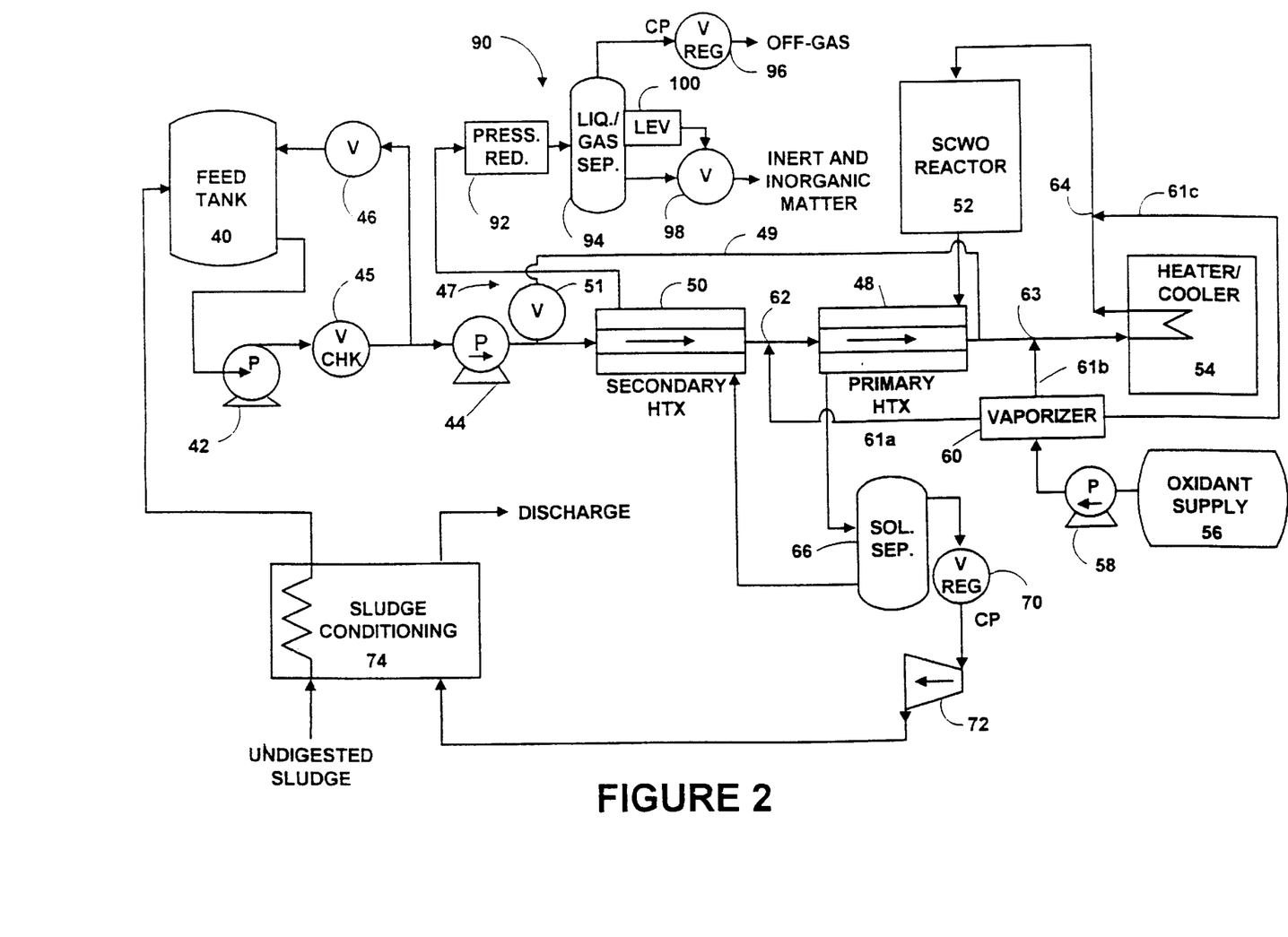
FIG. 2 is a diagrammatic representation of the preferred hydrothermal process according to the invention.

Referring to FIG. 2, the hydrothermal unit 10 collects thickened and conditioned wastewater sludge or feed mixture in a feed tank 40. A pump 42 preferably comprising a grinder pump, feeds a high pressure pump 44 through a suitable check valve 45. A supply pressure control device 46 maintains a desired input pressure to the high pressure pump 44 and returns the excess feed mixture back to the feed tank 40. The device 46 may comprise capillary tubes, an orifice, or a control valve. The high pressure pump 44 may comprise a variable speed pump or other suitable pump and operates to pressurize the feed mixture to a supercritical pressure, that is, a pressure above the critical pressure for water, approximately 3200 psia. Preferably the pressure applied by the pump 44 is in a range from 3600 psia to 4500 psia.

The pressurized feed mixture is directed to one or more heat exchangers and preferably a primary heat exchanger 48 and a secondary heat exchanger 50. The primary heat exchanger 48 may be any suitable arrangement for transferring heat from the effluent from supercritical water oxidation reactor 52 to the feed mixture. The heat exchanger 48 is referred to as the primary heat exchanger because it is the primary mechanism for raising the feed mixture temperature to reach a desired reaction initiating temperature discussed below. Where the secondary heat exchanger 50 is used, it is positioned ahead of the primary heat exchanger 48. The secondary heat exchanger 50 transfers heat from a portion of the supercritical water oxidation effluent to the feed mixture to recover additional energy from the supercritical oxidation reaction and provide preheating. Similarly to the primary heat exchanger 48, the secondary heat exchanger 50 may comprise any suitable heat exchanger arrangement including a tube-in-tube or shell and tube heat exchanger, for example.

The preferred form of the invention includes a heat exchanger bypass arrangement or means 47 for selectively allowing a portion of the feed mixture to bypass the heat exchange arrangement. The heat exchange bypass means 47 includes a bypass conduit 49 and a control valve 51. The control valve 51 is controlled by the temperature sensed by a suitable sensing device (not shown) at a point after the heat exchange arrangement and conduit 49. The heat exchange bypass means compensates for heat exchange rate variations due to scaling in the heat exchangers or variations in flow rate. When the temperature sensed by the sensor is higher than a target temperature, the sensor causes an actuator (not shown) associated with the valve 51 to open the valve allowing a portion of the feed mixture to bypass the heat exchangers and reduce the temperature of the mixture downstream of the heat exchangers.

The feed mixture is heated to at or near a reaction initiating temperature with the heat exchanger arrangement. The reaction initiating temperature depends upon the constituent organic material included in the feed mixture. According to the invention, the reaction initiating temperature is below the critical temperature for water, that is, below 705° F., but at or above a temperature at which low light-off temperature constituents in the feed mixture will at least partially oxidize in the presence of an oxidant. This reaction initiating temperature may range from approximately 200° F. to 675° F. and will depend upon the nature and concentration of low light-off temperature constituents. These constituents typically include carbon-sulphur, carbon-nitrogen, carbon-chlorine, carbon-carbon bonds, and carbon-oxygen single bonds. The low light-off temperature constituents begin to oxidize at the reaction initiating temperature to release heat. Because the mixture is sufficiently pressurized to prevent steam formation, the heat from this initial oxidation increases the temperature and total enthalpy of the now partially oxidized mixture.

It is important to note that the low light-off temperature constituents of the feed mixture may not completely oxidize at the reaction initiating temperature. Rather, the initial oxidation reaction may form more stable or higher light-off temperature intermediate organic compounds. As the temperature rises from the initial reaction temperature in the presence of sufficient oxidant, more and more of the low light-off temperature constituents are removed from the mixture and the intermediate products begin to oxidize further releasing more heat to reach the critical temperature for water.

The hydrothermal unit 10 also includes feed mixture temperature adjusting means preferably comprising a heater/cooler 54. The heater/cooler 54 is operated by a control arrangement (not shown) to adjust the temperature of the feed mixture entering the reactor to obtain a specified temperature value within the reactor 52. Typically, the temperature of the reactor effluent is used to control the heater/cooler 54, although any one of several temperatures measured along the length of the reactor can be used for this purpose. The heating or cooling applied by the heater/cooler 54 is dependent upon the COD (heating value) of the feed mixture and the amount of heat recovered in the primary and secondary heat exchangers. Specifically, the COD of the feed mixture determines the ultimate sensible heat effect of completely oxidizing the sludge. The heat exchanger and bypass arrangement 49 are the primary variables that determine the amount of feed preheating obtained because the initial temperature of the feed mixture and the outlet temperature of the reactor 52 are held constant. In the preferred form of the invention, the bypass arrangement and the COD of the feed mixture are controlled to minimize the heat that must be added or removed through the heater/cooler 54.

An oxidant is injected into the feed mixture through a suitable mechanism prior to a point at which the feed mixture reaches the critical temperature for water. The injection point may be before or after the primary heat exchanger 48 and preferably after the heater/cooler 54. The oxidant is provided from an oxidant supply 56 and pressurized to an injection pressure by compressor 58. The preferred form of the invention also includes a vaporizer 60 for ensuring that the oxidant is injected in a gas phase. Suitable valving in the oxidant injection lines 61a, 61b, or 61c, may be used to control the point at which oxidant is introduced into the feed mixture. The oxidant may comprise air or pure oxygen. Alternatively, a liquid such as hydrogen peroxide, nitric acid, or solutions of nitrate salts may be used as an oxidant.

The temperature of the feed mixture and the feed mixture itself are controlled to partially react the feed mixture and drive the temperature of the partially reacted mixture to a supercritical temperature in or before the supercritical water oxidation reactor. Initiating the reaction in the system conduit such as in lines 62, 63, or 64 before the supercritical water oxidation reactor 52 produces several benefits. First, the early oxidation reaction accommodates a larger temperature rise (due to the heat of reaction) before reaching the maximum operating temperature for reactor 52 approximately 950° F. to 1400° F. Thus, the feed mixture may contain higher concentrations of sludges. Secondly, initiating the reaction at subcritical conditions allows the heat generated in the subcritical reaction to heat the feed mixture to near the critical temperature for water and significantly reduces the amount of heat which would otherwise be required to be added through a heater.

The supercritical water oxidation reactor 52 may be any suitable reactor type made from materials which can withstand the temperatures and pressures produced in the supercritical water oxidation reaction. For example, the supercritical water oxidation reactor 52 may comprise a small diameter elongated tube or a coiled tube. The tube inner diameter will depend upon system capacity and velocity and the nature of the feed mixture, but may range from 1.25 inches to 6 inches to achieve flow velocities in the system between approximately 2 feet to 14 feet per second. The primary requirement for the supercritical water oxidation reactor 52 is that the reactor provide sufficient residence time at supercritical conditions to completely oxidize substantially all organic material in the feed mixture. Since the supercritical water oxidation reaction proceeds very quickly, the residence times in the reactor may be as low as 10 seconds. However, the preferred reactor 52 is arranged to have a residence time of approximately one minute to ensure the reaction is completed. Although not shown in the drawing, the reactor 52 may also include one or more ports through which cool water may be injected if necessary to control the temperature of the reacting mixture.

The heat duty of the heater/cooler 54 will be controlled by the maximum temperature sensed by any one of several temperature sensors located in the reactor 52. The preferred control method would also include inputs from temperature sensors located before and after the primary heat exchanger 48 which cause the heater/cooler 54 to stop firing in the event of an unusually high temperature at these locations. For example, a sudden large increase in the heating value of the feed mixture might cause a temperature excursion in the primary heat exchanger 48 (assuming oxidant addition before the heat exchanger 48) which would cause the heater/cooler 54 to stop firing, overriding the temperatures signals from the reactor. An additional temperature control safety feature would consist of a quench pump that injects cold water into the process conduit before or after the heater/cooler 54 to cool the reaction mixture in the event of a reactor temperature exceeding a predetermined setpoint, typically 1200° F.

The effluent from the supercritical water oxidation reactor 52, which may be at a temperature of between 950° F. and 1400° F., and preferably around 1100° F., is used as a heat exchange fluid in the primary heat exchanger 48. This heat exchange reduces the temperature of the supercritical effluent to a temperature in a range between 450° F. and 1000° F. In the illustrated preferred form of the invention, which uses a portion of the reactor effluent to produce electricity, the temperature of the reactor effluent will be generally 900° F. or better depending primarily on the requirements of the device used to produce electricity. Thus, in this preferred form of the invention, effluent remains above critical conditions and this reduced temperature, supercritical effluent is directed to a solids separator 66.

The solids separator 66 operates to split the reactor effluent into two components. The first component comprises a clean supercritical fluid effluent while the second component comprises a supercritical fluid effluent containing or laden with inert or inorganic solids. The solids contained in this second component will include inorganic materials such as sand, clay, and precipitated salts which have a low solubility in water at supercritical conditions. The solids separator 66 may comprise a hydrocyclone device or a centrifuge, or any other suitable solids separating device capable of operating at supercritical conditions. Those skilled in the art will appreciate that the solids separator 66 may receive a subcritical effluent in which the two output streams would also include subcritical fluids.

The preferred clean supercritical fluid effluent is removed from the solids separator through a pressure regulator valve 70. The pressure regulator valve 70 reduces the pressure of the clean supercritical fluid effluent to a suitable pressure for a standard quality steam, along with gasses produced in the oxidation process, primarily $CO_2$, $N_2$ and excess oxygen. For example, the pressure may be reduced to produce a 600 psig steam at a temperature of between approximately 650° F. and 750° F. This standard quality steam may be used to drive a turbine 72. The turbine 72 may be connected to drive an electrical generator (not shown) for producing electricity.

In the preferred form of the invention, heat from the clean supercritical fluid effluent is used to condition the sludge from the wastewater treatment plant. In the illustrated form of the invention, the low pressure exhaust from the turbine 72 is directed to a sludge conditioning arrangement or means 74. The sludge conditioning means 74 serves to thicken the sludge further and preferably heat the sludge to reduce its viscosity and otherwise enhance the pumpability of the sludge. The heat added to the sludge at this point also helps raise the sludge temperature to the reaction initiating temperature.

Alternatively to using the turbine exhaust to condition the sludge, the high pressure steam may be used directly by the sludge conditioning means 74. For example, the high pressure standard quality steam may be directed from the regulator 70 to a heat exchanger (not shown) to heat the sludge and evaporate water to increase VSS of the feed mixture.

Figure 3:
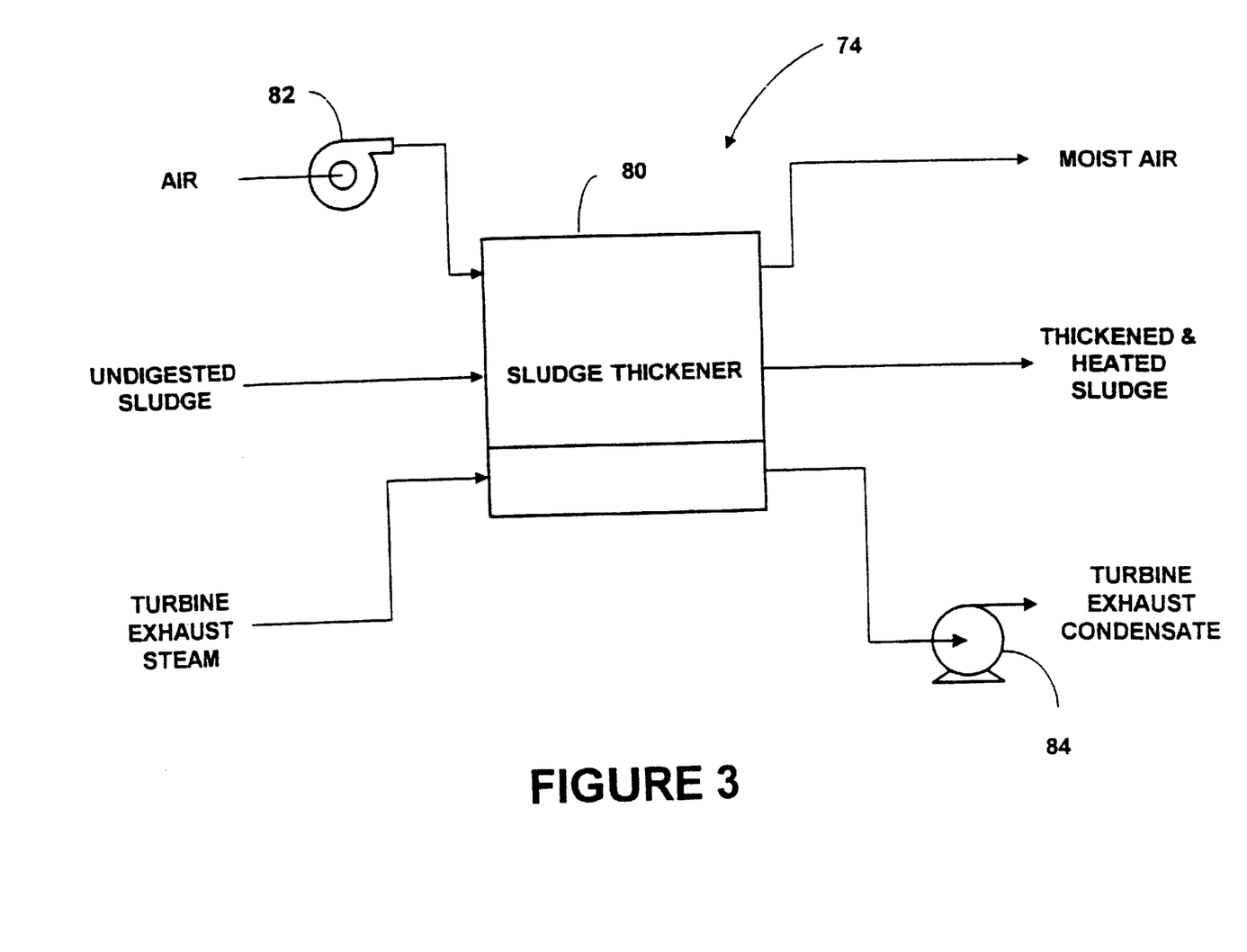
FIG. 3 is a diagrammatic representation of a sludge conditioning arrangement embodying the principles of the invention.

Referring to FIG. 3, the preferred sludge conditioning means 74 includes a heat exchanger/condenser 80 and a blower 82. The heat exchanger/condenser is adapted to receive the turbine exhaust steam in a heat exchange relationship with the sludge or other waste. The steam will include $CO_2$, $N_2$, and any other reactor effluent gas and may be below atmospheric pressure and at a temperature from 135° F. to 150° F., for example. The heat exchange with the steam raises the temperature of the sludge, while blower 82 forces air over the surface of the sludge to help remove water evaporating from the sludge. The steam condenses in the heat exchanger/condenser 80 and is pumped back to atmospheric pressure by condensate pump 84. In the preferred form, the heat exchanger/condenser 80 comprises a U-shaped trough having a jacket (not shown) for receiving the steam. Heat is exchanged between the steam in the jacket and the sludge in the trough. An auger or other suitable agitator in the trough continuously moves the sludge and may even scrape the bottom surface and sides of the trough to provide more even heating, enhance evaporation, and prevent sludge from baking onto the surface of the trough. An area above the trough is left open for allowing air from the blower 82 to pass over the surface of the sludge in the trough.

In an alternate sludge conditioning arrangement, not shown in the drawings, a blower may be used to force air over an air cooled condenser which accepts the turbine exhaust steam. The blower air is heated by the condenser and this hot air stream may be directed over the sludge to help evaporate water from the sludge and heat the sludge somewhat.

Referring back to FIG. 2, the solids laden supercritical fluid from the solids separator is preferably used as a heat exchange fluid for the secondary heat exchanger 50. This additional heat exchange with effluent from the supercritical water oxidation reaction makes maximum use of energy from the reaction. However, those skilled in the art will readily appreciate that the solids laden supercritical fluid, after being cooled, may be passed directly to a pressure let down arrangement.

The preferred pressure let down or pressure reducing arrangement or means 90 operates to reduce the pressure in the solids laden effluent to approximately atmospheric pressure without relying on an orifice or capillary for the entire pressure reduction. The pressure let down means 90 includes a pressure reducing device 92, a separation vessel 94, a back pressure regulating valve 96 and a liquid removal valve 98. The pressure reducing device 92 may comprise an orifice or other suitable device and reduces the pressure from a critical pressure to a gas phase pressure which may be approximately from 500 psia to 3000 psia. This gas phase pressure allows a distinct gas phase to segregate to the top of the vessel 94 with a solids laden liquid phase collecting at the bottom of the separation vessel. The back pressure valve 96 is connected to hold the gas phase pressure on the vessel 94 and releases gas to maintain the pressure on the vessel. The solids laden liquid collecting in the bottom of the vessel 94 is removed through the liquid removal valve 98 which is connected to the vessel by a suitable conduit and which preferably operates in either a full open or full closed position. A suitable level control arrangement LEV 100 associated with the vessel 94 controls the position of the liquid removal valve 98. When the level control mechanism 100 senses the liquid level rising above a particular point in the separation vessel 94, the control causes the liquid removal valve 98 to open momentarily and allow solids laden liquid to flow out of the vessel to atmospheric or near atmospheric pressure. The level control 100 may include any suitable level detecting arrangement such as a float associated with the vessel 94. Although the liquid removal valve 98 opens and closes abruptly, the gas in the vessel 94 expands or compresses to dampen pressure transients in the vessel 94. By having a large flow area and operating in the full open or full closed position, the liquid removal is not subject to severe erosion of valve components from solid particles in the liquid effluent and is also less subject to plugging. Furthermore, change in the pressure drop across the pressure reducing device 92, which may occur over time due to erosion in the device 92, is compensated for automatically by the back pressure regulating valve 96.

The liquid removed from the vessel 94 contains water and primarily inert or inorganic solids, although some very minor amounts of organic matter, on the order of 5 ppm may remain. The liquid may also include minor amounts of salts in solution. The inert/inorganic solids comprise sand, silt, clay, and typically form 10% to 25% by weight of the liquid stream. Water may be added to the vessel if there is insufficient water condensing from the effluent stream. The solids in this liquid may be allowed to settle out by gravity or by other separation means and then disposed of in any permissible manner. The water may be discharged or sent to the chlorine contact basin 18 of the treatment facility (FIG. 1).

The make-up of the off gas removed from the vessel 94 will vary with the operating pressure of the vessel, that is the gas phase pressure. The off-gas will contain primarily $CO_2$ with lesser amounts of excess oxygen, nitrogen, and water vapor.

The method for treating wastewater sludges according to the invention may be described with particular reference to FIG. 2. The method includes first producing a feed mixture having a total VSS of 1.0% to 14.4%, a heating value of 100 Btu to 1400 Btu/lb, and COD of 17,000 ppm to 235,000 ppm, including approximately 50% low light-off temperature material. In the preferred form of the invention, the feed mixture is produced from an undigested, thickened wastewater sludge from wastewater treatment facility 12 (FIG. 1).

The method next includes pressurizing the feed mixture with high pressure pump 44 to a supercritical pressure, that is, a pressure above the critical pressure for water, approximately 3200 psia, and preferably, 3600 psia to 4500 psia. The feed mixture is then heated by heat exchange with a supercritical oxidation reactor effluent using heat exchangers 48 and 50 and the temperature is further adjusted with the heater/cooler 54 to bring the feed mixture to a reaction initiating temperature. An oxidant is then injected at the reaction initiating temperature from the oxidant compressor 58 through the desired injection line or lines 61a, 61b, or 61c. The reaction initiating temperature is a temperature below the critical temperature for water, but at or above the light-off temperature for the low light-off temperature constituents in the feed mixture. The reaction initiating temperature may range from 200° F. to 675° F.

The method next includes reacting the feed mixture and particularly, the low light-off temperature constituents in the feed mixture beginning at the reaction initiating temperature to raise the temperature of the then partially reacted mixture to at least the critical temperature for water either before or in the supercritical water oxidation reactor 52. In the reactor 52, the partially reacted feed mixture is subjected to supercritical water oxidation below 1400° F. for a time sufficient to ensure complete oxidation of all volatile suspended solids in the mixture. The reactor residence time may range from 10 seconds to 3 minutes. Subjecting the feed mixture to supercritical water oxidation in the reactor 52 produces a supercritical water oxidation effluent comprising a mixture of supercritical fluids and, inert and inorganic solids, including precipitated salts.

The method may next include separating the effluent from the reactor 52 to produce a clean supercritical fluid effluent and a solids laden supercritical fluid effluent. The method of the invention may further include reducing the pressure of the clean supercritical fluid effluent to produce a process steam and reducing the pressure of the solids laden fluid effluent to atmospheric pressure or other desired lower pressure.

The preferred step of reducing the pressure of the solids laden supercritical fluid effluent comprises reducing the temperature of the mixture below the critical temperature of water and reducing the pressure of the mixture with the reducing device 92 to allow a gas phase to separate from a liquid phase in the separation vessel 94. The method also includes maintaining the gas phase pressure on the vessel 94 by releasing separated gas through the back pressure valve 96, and removing solids laden liquid from the vessel through the liquid removal valve 98 under the control of liquid level sensing device associated with the separation vessel 94.

The method of the invention may further include recovering energy from the supercritical water oxidation reactor effluent. For example, the method may include the step of driving the turbine 72 with the process steam produced from the clean supercritical fluid effluent from the reactor 52. Additionally, the method may include using energy from the supercritical fluid effluent to thicken and condition the sludge to produce the desired feed mixture. The step of using heat from the reactor effluent may comprise producing a hot air stream and passing it over the sludge to evaporate water from the sludge, or alternatively, heating the sludge with heat from the supercritical water oxidation reactor effluent to evaporate water from the sludge.

The above described preferred embodiments are intended to illustrate the principles of the invention, but not to limit the scope of the invention. Various other embodiments and modifications to these preferred embodiments may be made by those skilled in the art without departing from the scope of the following claims.

For example, where it is not desirable to produce a standard quality steam for driving a turbine or for other uses, the solids separator 66 and secondary heat exchanger 50 may be omitted from the system. The effluent from the reactor 52 may in this case be sent directly to the pressure reducing means 90, or to the pressure reducing means after transferring heat from the effluent for conditioning the sludge to produce the desired feed mixture and cool the effluent. Furthermore, since it is not necessary to separate the solids from the supercritical fluid stream to produce useable steam, the temperature of the effluent may be lowered below the critical temperature in the primary heat exchanger.

Where the standard quality steam is not desired, the heat exchanger 48 may be sized to heat the feed mixture without the need for the separate heater/cooler 54. In this case, the bypass means 47 may be used to adjust the temperature of the feed mixture to the reaction initiating temperature. Thus, the bypass means 47 may comprise the temperature adjusting means.

Another arrangement for the temperature adjusting means may include a heat exchanger to remove heat from the reacting mixture after the point at which the oxidant is injected. This arrangement may accommodate even higher COD feed mixtures and may recover more useful heat from the reaction.

Also, those skilled in the art will readily appreciate that the hydrothermal unit components must be heated to near operating conditions in a start-up process prior to operation. Components are preferably heated by circulating clean water through the system. This clean water may be heated using the heater/cooler 54 where such a heater is included in the system, or a separate start-up heater. The conduit and valving required for introducing the clean, startup water have been omitted in the drawings for the purpose of simplifying the figures.

We claim:

1. An apparatus for treating undigested wastewater sludges, the apparatus comprising:

(a) a pump adapted to receive a feed mixture and pressurize the feed mixture to a pressure above the critical pressure for water, the feed mixture comprising a wastewater sludge;

(b) a heat exchanger arrangement connected to receive the pressurized feed mixture from the pump in a heat exchange relationship with at least one heat exchange fluid;

(c) a heater connected to receive the feed mixture from the heat exchanger arrangement through a first reaction conduit;

(d) oxidant injection means for introducing an oxidant into the feed mixture at least at a point after the feed mixture has exchanged heat with the heat exchange fluid in the heat exchanger arrangement and before the heater; and (e) a supercritical water oxidation reactor connected to receive a partially reacted mixture from the heater through a second reaction conduit, the partially reacted mixture comprising partially oxidized feed mixture, the supercritical water oxidation reactor for maintaining the partially reacted mixture at a supercritical temperature and supercritical pressure for a time sufficient to oxidize substantially all organic material within the partially reacted mixture and produce a supercritical effluent.

2. The apparatus of claim 1 wherein the heat exchange fluid includes an effluent from the supercritical water oxidation reactor, and further comprising:

(a) a solids separator for receiving the effluent from the heat exchanger arrangement at supercritical conditions and for separating a solids laden effluent from a clean fluid effluent, the solids laden effluent comprising solids in a fluid;

(b) clean effluent pressure reduction means for receiving the clean fluid effluent and reducing the pressure of said effluent to produce a process steam; and (c) pressure let down means for reducing the pressure of the solids laden effluent to substantially atmospheric conditions to produce an off gas and water containing inorganic material.

3. The apparatus of claim 2 further comprising:

(a) sludge conditioning means for applying heat from the process steam to thicken the sludge.

4. The apparatus of claim 2 further comprising:

(a) a steam turbine adapted to produce mechanical energy from the process steam and a low pressure turbine exhaust.

5. The apparatus of claim 4 further comprising:

(a) sludge conditioning means for applying heat from the low pressure turbine exhaust to thicken sludge.

6. The apparatus of claim 5 wherein the sludge conditioning means includes:

(a) a heat exchanger condenser having a trough for receiving a sludge to be thickened and a jacket for receiving the turbine exhaust in a heat exchange relationship with the sludge in the trough; and (b) a blower for forcing air over the surface of the sludge in the trough to enhance evaporation from the sludge stream.

7. The apparatus of claim 2 wherein the heat exchanger arrangement comprises:

(a) a primary heat exchanger connected to receive the supercritical effluent from the supercritical water oxidation reactor in a heat exchange relationship with the feed mixture; and (b) a secondary heat exchanger connected to transmit the feed mixture from the pump to the primary heat exchanger and connected to receive the solids laden effluent from the solids separator in a heat exchange relationship with the feed mixture to preheat the feed mixture.

8. The apparatus of claim 2 wherein the pressure let down means comprises:

(a) a pressure reducing device for reducing the pressure of the solids laden effluent to a gas phase pressure at which a significant gas phase exists with a solids laden liquid phase;

(b) a vessel connected to receive the solids laden liquid phase and gas at the gas phase pressure;

(c) a pressure regulator valve associated with the vessel for maintaining the gas phase pressure in the vessel and allowing gas to exit the vessel to maintain the gas phase pressure;

(d) a liquid removal conduit connected below a liquid level in the vessel and having a two-position liquid removal valve adapted to reside exclusively alternatively in a fully open or fully closed position; and (e) control means for, independently of the pressure regulator valve, moving the liquid removal valve to the fully open position in response to an upper liquid level in the vessel and for moving the liquid removal valve to the fully closed position in response to a lower liquid level in the vessel.

9. The apparatus of claim 8 wherein the control means for controlling the position of the liquid removal valve comprises:

(a) a float mechanism associated with the vessel.

10. An apparatus for depressurizing a high pressure fluid containing solids, the apparatus comprising:

(a) a pressure reducing device for reducing the pressure of a high pressure solids laden fluid to a gas phase pressure at which a significant gas phase exists with a solids laden liquid phase;

(b) a vessel connected to receive the solids laden liquid phase and gas at the gas phase pressure;

(c) a pressure regulator valve associated with the vessel for maintaining the gas phase pressure in the vessel and allowing gas to exit the vessel to maintain the gas phase pressure;

(d) a liquid removal conduit connected below a liquid level in the vessel and having a two-position liquid removal valve adapted to reside exclusively alternatively in a fully open or fully closed position; and (e) control means for, independently of the pressure regulator valve, moving the liquid level in the vessel and for moving the liquid removal valve to the fully closed position in response to a lower liquid level in the vessel.

11. The apparatus of claim 10 wherein the control means for controlling the position of the liquid removal valve comprises:

(a) a float mechanism associated with the vessel.

* * * * *

UNITED STATES PATENT AND TRADEMARK OFFICE
CERTIFICATE OF CORRECTION

PATENT NO. : 5,888,389
DATED : March 30, 1999
INVENTOR(S) : James Walton Griffith, William Tracy Wofford, III, and James Randolph Griffith It is certified that error appears in the above-identified patent and that said Letters Patent is hereby corrected as shown below:

In Claim 10, column 14, line 46 of the Patent, after the word "liquid" insert --removal valve to the fully open position in response to an upper liquid--.

Signed and Sealed this

Thirty-first Day of August, 1999

Attest:

Q. TODD DICKINSON

*Attesting Officer*     *Acting Commissioner of Patents and Trademarks*